US008083475B2

(12) United States Patent
Bulgrin et al.

(10) Patent No.: US 8,083,475 B2
(45) Date of Patent: Dec. 27, 2011

(54) TURBINE BUCKET ANGEL WING COMPRESSION SEAL

(75) Inventors: Charles Alan Bulgrin, Avon, IN (US); Ariel Caesar-Prepena Jacala, Travelers Rest, SC (US); Gary Michael Itzel, Simpsonville, SC (US); Ralph Chris Bruner, Greenville, SC (US)

(73) Assignee: General Electric Company, Schenectady, NY (US)

(*) Notice: Subject to any disclaimer, the term of this patent is extended or adjusted under 35 U.S.C. 154(b) by 564 days.

(21) Appl. No.: 12/352,664

(22) Filed: Jan. 13, 2009

(65) Prior Publication Data

US 2010/0178159 A1 Jul. 15, 2010

(51) Int. Cl.

| | |
|---|---|
| ***F01D 5/30*** | (2006.01) |
| ***F01D 11/00*** | (2006.01) |
| ***F01D 25/24*** | (2006.01) |
| ***F01D 11/02*** | (2006.01) |
| ***B63H 1/16*** | (2006.01) |
| ***B64C 11/00*** | (2006.01) |
| ***B64C 11/04*** | (2006.01) |
| ***F03B 3/12*** | (2006.01) |
| ***F04D 29/34*** | (2006.01) |
| ***F04D 3/00*** | (2006.01) |
| ***F04D 19/00*** | (2006.01) |

(52) U.S. Cl. .............. 415/173.7; 415/174.5; 416/193 R; 416/193 A; 416/219 R

(58) Field of Classification Search ............... 415/173.7, 415/174.5; 416/193 R, 193 A, 219 R See application file for complete search history.

(56) References Cited

U.S. PATENT DOCUMENTS

| | | | |
|---|---|---|---|
| 6,189,891 | B1 | 2/2001 | Tomita et al. |
| 6,506,016 | B1 | 1/2003 | Wang |
| 2007/0224035 | A1 | 9/2007 | Nigmatulin |
| 2008/0014094 | A1 | 1/2008 | Itzel et al. |
| 2008/0056889 | A1 | 3/2008 | Cheng et al. |

OTHER PUBLICATIONS

U.S. Appl. No. 11/896,533, filed Sep. 4, 2007, Bulgrin, et al.

*Primary Examiner* — David Zarneke

(74) *Attorney, Agent, or Firm* — Sutherland Asbill & Brennan LLP

(57) ABSTRACT

The present application provides an angel wing seal for a turbine bucket. The angel wing seal may include a first wing with a sinusoidally-shaped outer edge and a number of wing teeth positioned thereon.

20 Claims, 5 Drawing Sheets

TURBINE BUCKET ANGEL WING COMPRESSION SEAL

TECHNICAL FIELD

The present application relates generally to gas turbine engines and more particularly relates to a turbine bucket having an angel wing compression seal with a sinusoidal shape.

BACKGROUND OF THE INVENTION

Minimizing secondary cooling air leakage through the wheel spaces may increase overall turbine performance and efficiency. The sealing mechanism should effectively seal between rotating components such as buckets, blades, disks, and spacers and stationary components such as nozzles, vanes, and diaphragms. Specifically, the hot gases flowing through the turbine should be prevented from "ingesting" or leaking into the wheel spaces between the rotating components attached to the rotor and the stationary components attached to the turbine shell.

The wheel space cavities may be pressurized to provide a positive outflow from the wheel spaces into the gas path. Angel wing type seals also may be used to minimize this outflow by restricting the gap through which the leakage may occur. These seals also create a pressure loss "labyrinth/seal tooth" mechanism to further reduce the outflow of the wheel space air.

A drawback with the angel wing type designs is that the gas path pressure profile may vary circumferentially, particularly downstream of the buckets. In order to prevent ingesting, the wheel space pressure should exceed that found at peak pressure locations. Current angel wing configurations, however, generally only provide a near uniform annular pressure throughout. At low gas path pressure locations, such as downstream of the suction side or concave side of the rotating airfoils, a higher pressure gradient may exist that may drive a high outflow of the wheel space air. Such a high outflow may starve or lessen the ability of the available cooling air to prevent ingestion downstream of the higher pressure regions.

There is a desire therefore for improved sealing mechanisms so as to minimize the loss of secondary cooling air through the wheel spaces. Reduction in the loss of the cooling air flow should improve overall gas turbine performance and efficiency.

SUMMARY OF THE INVENTION

The present application thus provides an angel wing seal for a turbine bucket. The angel wing seal may include a first wing with a sinusoidally-shaped outer edge and a number of wing teeth positioned thereon.

The present application further provides a method of reducing turbine bucket cooling air losses. The method may include the steps of positioning an angel wing seal about the bucket, providing a sinusoidally shaped outer edge on the angel wing seal and rotating the bucket such that the sinusoidally shaped outer edge creates a pressure profile that is substantially in phase with a pressure profile created by the bucket.

The present application further provides an angel wing seal for a turbine bucket. The angel wing seal may include an upper wing with a sinusoidally-shaped outer edge, a number of wing teeth positioned on the upper wing, and a gap defined by the wing teeth.

These and other features and improvements of the present application will become apparent to one of ordinary skill in the art upon review of the following detailed description when taken in conjunction with the several drawings and the appended claims.

DETAILED DESCRIPTION

Figure 1:
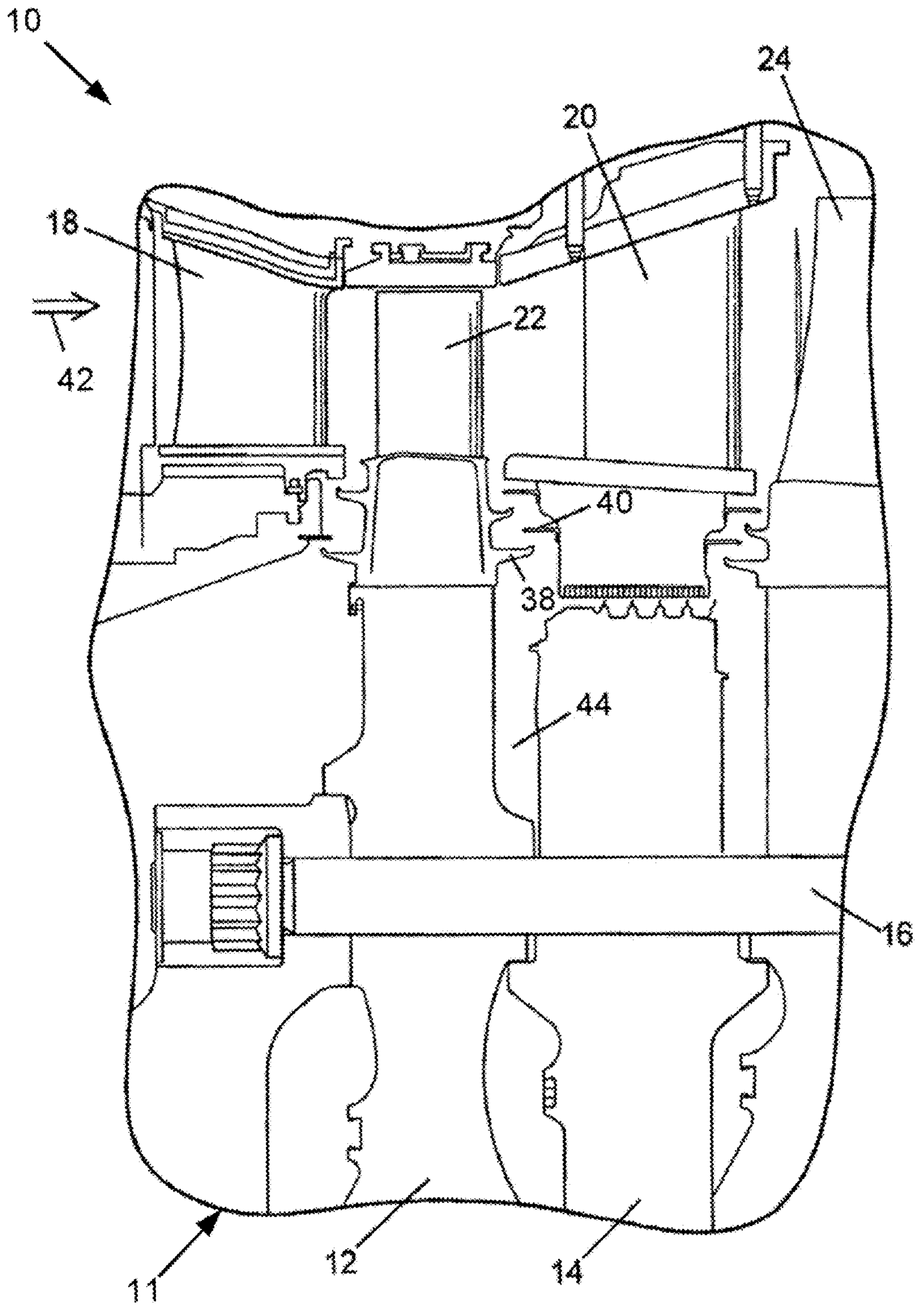
FIG. 1 is a fragmentary schematic showing a cross-section of a portion of the turbine.

Referring now to the drawings, in which like numerals refer to like elements throughout the several views, FIG. 1 shows a section of a gas turbine 10. The gas turbine 10 includes a rotor 11 having axially spaced rotor wheels 12 and spacers 14 joined one to the other by a number of circumferentially spaced, axially extending bolts 16. The turbine 10 includes various stages having nozzles, for example, a first stage nozzle 18 and a second stage nozzle 20, with a number of circumferentially spaced stator blades. Between the nozzles 18, 20 and rotating with the rotor 11 are a number of rotor blades, for example, a first stage bucket 22 and a second stage bucket 24.

Figure 2:
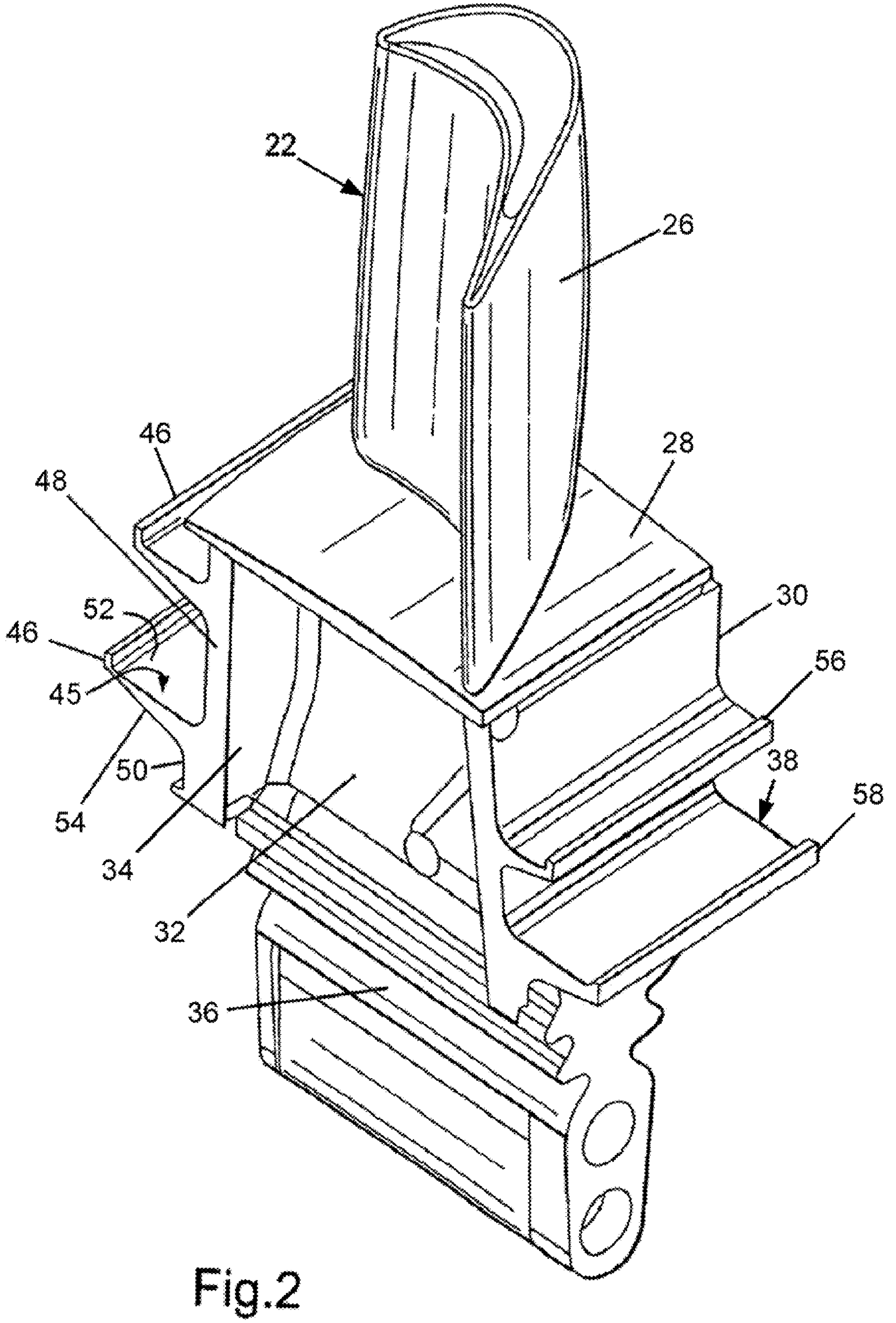
FIG. 2 is a perspective view of a known turbine bucket.

Referring to FIG. 2, each bucket 22, 24 may include an airfoil 26 mounted on a platform 28 of a shank 30. The shank 30 may have a shank pocket 32 with integral cover plates 34 and a dovetail 36 for connection with the rotor wheel 12. The buckets 22, 24 may be integrally cast. Other components and turbine configurations may be used herein.

The buckets 22, 24 may include a number of axially projecting angel wing seals 38. The angel wing seals 38 may cooperate with a number of lands 40 formed on the adjacent nozzles 18, 20 so as to limit the ingestion of hot gasses flowing therethrough. A hot gas path may be indicated by an arrow 42. The angel wing seals 38 limit the flow into the wheel spaces 44.

The angel wing seals 38 may include an angel wing body 45, an upturn or a tip 46 at a distal end, upper and lower wing root surfaces 48, 50, and upper and lower seal body surfaces 52, 54. The upper and lower seal body surfaces 52, 54 generally may be linear surfaces extending from the root surfaces 48, 50 to the tip 46. The upper body surface 52 may be an arcuate surface that is concentric about the axis of rotation of the rotor 11. As is shown, each side of the buckets 22, 24 may have an upper angel wing 56 and a lower angel wing 58. Other configurations of the angel wing seals 38 and similar structures may be used.

Figure 3:
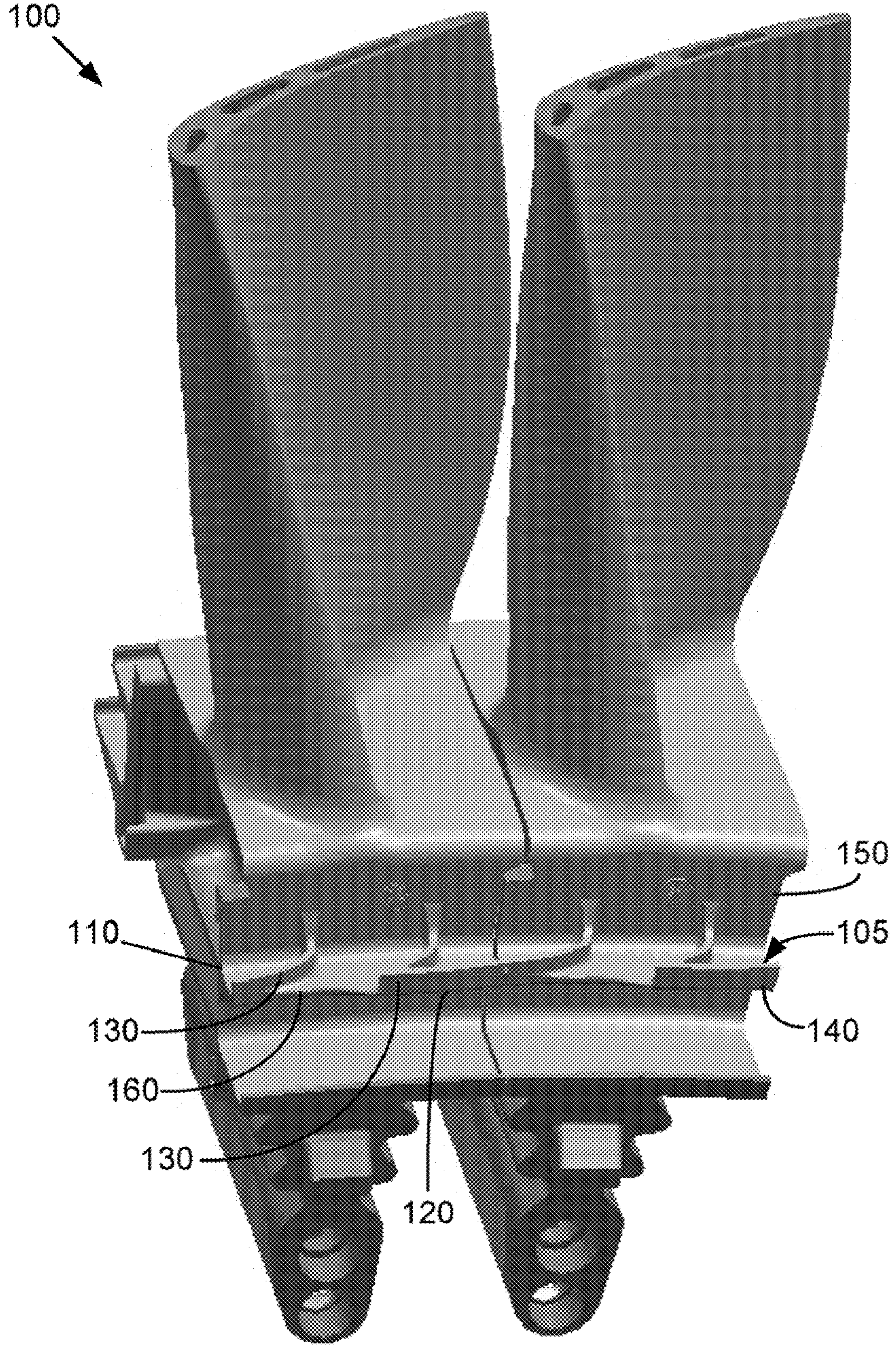
FIG. 3 is a perspective view of a turbine bucket with an angel wing seal as is described herein.
Figure 4:
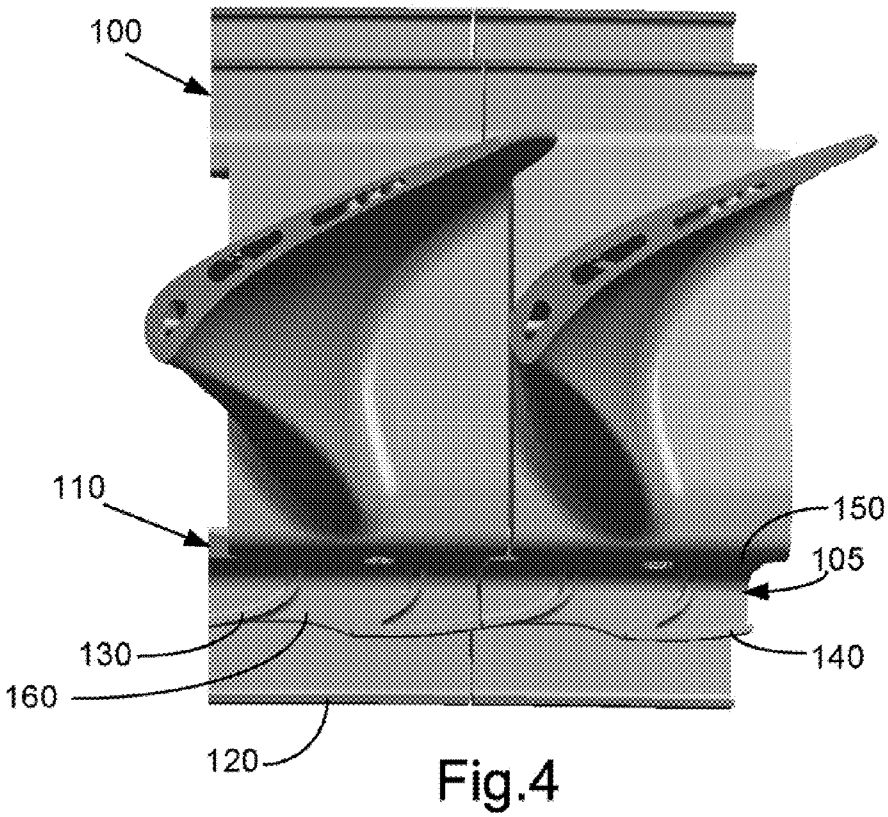
FIG. 4 is a top plan view of the turbine bucket with the angel wing seal of FIG. 3.

FIGS. 3 and 4 show an embodiment of a bucket 100 with an angel wing seal 105 as is described herein. In this example, the angel wing seal 105 includes an upper wing 110 with both a sinusoidally-shaped outer edge 120 and a number of wing teeth 130. As is shown, the sinusoidally-shaped outer edge 120 flows continuously from one bucket 100 to the next. The amplitude and frequency of the sinusoidally-shaped outer edge 120 may vary. The wing teeth 130 may extend from a tip 140 to an upper root surface 150 of the bucket 110. The wing teeth 130 further may extend along the tip 140. The wing teeth 130 likewise may flow continuously from one bucket 100 to the next. As is shown, the wing teeth 130 may have a curved shape and are spaced apart so as to form a tooth gap 160 therebetween. The shape of the wing teeth 130 and the tooth gap 160 may vary. The depth of the wing teeth 130 likewise may vary.

The combination of the sinusoidal shape of the outer edge 120 and the wing teeth 130 produce a repetitive annular pressure pattern that coincides and opposes the gas path pressure profile surrounding the bucket 100. Specifically, this sinusoidal pressure profile created by the angel wing seal 105 may be in phase with the frequency of the pressure profile created by the rotating bucket 100. These pressure profiles thus may be synchronized so as to provide a more uniform overall pressure gradient. Such a uniform pressure gradient potentially results in considerably less leakage in the wheel space cooling air. Moreover, the average wheel space pressure may be lowered so as to provide less of a pressure gradient that drives the outflow of the cooling air leakage.

The uniquely shaped upper wing 110 with the wing teeth 130 thereon provide the angel wing seal 105 with an angle of inclination relevant to the direction of rotation of the bucket 100. Specifically, the angel wing seal 105 provides a forward facing outer edge 120 such that the relative velocity of the cooling air may be decreased while the static pressure of the air is increased from the work performed on the air by the angel wing seal 105. The angel wing seal 105 thus addresses circumferential pressure gradients and, as such, may minimize secondary cooling loses. Overall cycle efficiency improvements thus may be obtained. The angel wing seal 105 may be used in any type of turbine. The angel wing seals 105 may be used at discrete locations so as to counter regions of localized high gas path pressure or the angel wing seals 105 may be in more widespread use.

Figure 6:
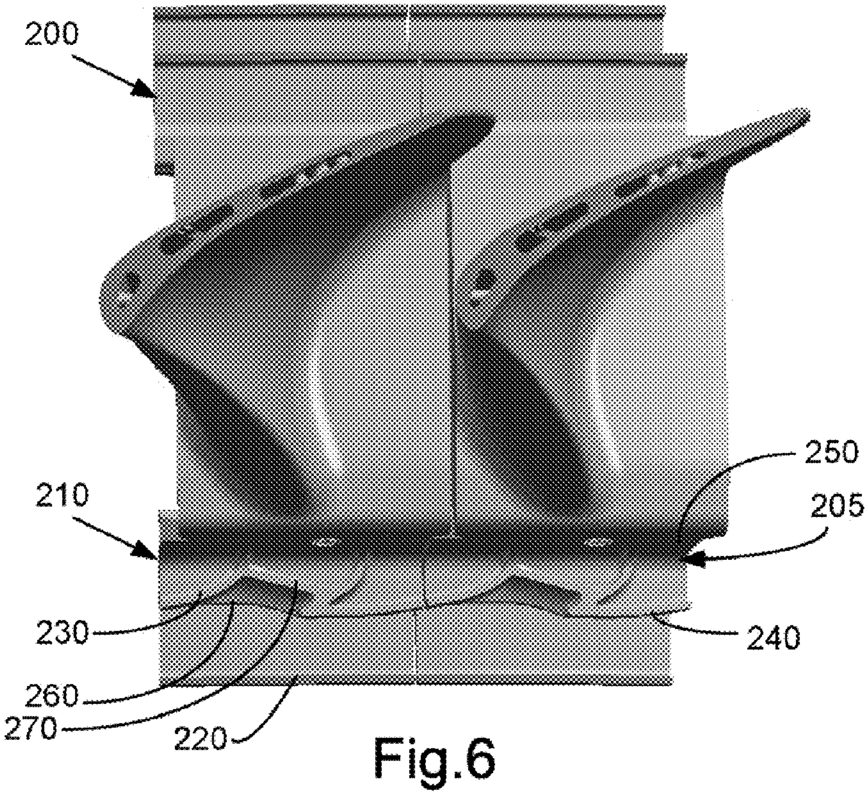
FIG. 6 is a top plan view of the turbine bucket with the angel wing seal of FIG. 5.
Figure 5:
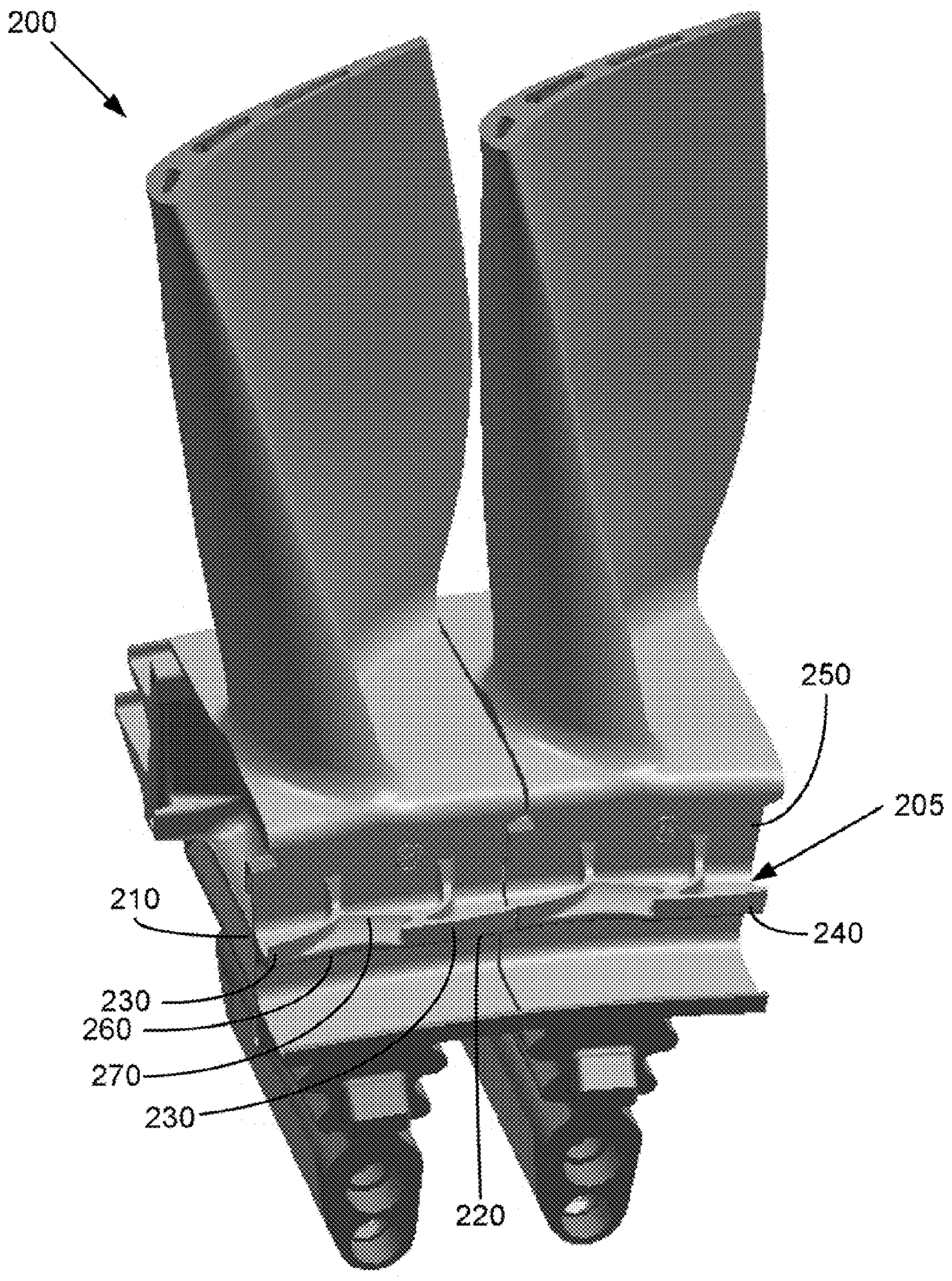
FIG. 5 is a perspective view of an alternative embodiment of a turbine bucket with an angel wing seal as is described herein.

FIGS. 5 and 6 show a further embodiment of a bucket 200 as is described herein. In this embodiment, the bucket 200 may include an angel wing seal 205 similar to the angel wing seal 105 described above. In this example, the bucket 200 may include an upper wing 210 with a similar outer edge 220 having a sinusoidal shape. The upper wing 210 also includes a number of wing teeth 230. The wing teeth 230 likewise extend from a tip 240 to an upper root surface 250 and along the tip 240. The wing teeth 230 may form a tooth gap 260 therebetween. In this example, however, the tooth gap 260 includes a gap tooth 270 therebetween. The gap tooth 270 extends from one wing tooth 230 to the next. The gap tooth 270 further restricts the cooling flow therethrough. Similar designs may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An angel wing seal for a turbine bucket, comprising:
a first wing;
the first wing comprising a sinusoidally-shaped outer edge; and
a plurality of wing teeth positioned on the first wing.

2. The angel wing seal of claim 1, wherein the first wing comprises an upper wing.

3. The angel wing seal of claim 1, wherein the first wing comprises a tip and a root surface.

4. The angel wing seal of claim 3, wherein the plurality of wing teeth extends from the tip to the root surface.

5. The angel wing seal of claim 4, wherein the plurality of wing teeth further extends along the tip.

6. The angel wing seal of claim 1, further comprising a gap defined by the plurality of wing teeth.

7. The angel wing seal of claim 6, wherein the gap comprises a gap tooth positioned therein.

8. The angel wing seal of claim 1, further comprising a plurality of buckets and wherein the sinusoidally shaped outer edge flows continuously from a first bucket to a second bucket.

9. The angel wing seal of claim 1, further comprising a plurality of buckets and wherein the plurality of wing teeth flows continuously from a first bucket to a second bucket.

10. The angel wing seal of claim 1, wherein the plurality of wing teeth comprises an angle of inclination tangential to a direction of rotation of the bucket.

11. A method of reducing turbine bucket cooling air losses, comprising:
positioning an angel wing seal about the bucket;
providing a sinusoidally shaped outer edge on the angel wing seal; and
rotating the bucket such that the sinusoidally shaped outer edge creates a pressure profile that is substantially in phase with a pressure profile created by the bucket.

12. The method of claim 11, further comprising creating a substantially uniform pressure gradient about the bucket.

13. The method of claim 10, further comprising providing a plurality of wing teeth on the angel wing seal at an angle to a direction of rotation of the bucket.

14. An angel wing seal for a turbine bucket, comprising:
an upper wing;
the upper wing comprising a sinusoidally-shaped outer edge;
a plurality of wing teeth positioned on the upper wing; and
a gap defined by the plurality of wing teeth.

15. The angel wing seal of claim 14, wherein the upper wing comprises a tip and a root surface.

16. The angel wing seal of claim 15, wherein the plurality of wing teeth extends from the tip to the root surface.

17. The angel wing seal of claim 16, wherein the plurality of wing teeth further extends along the tip.

18. The angel wing seal of claim 14, wherein the gap comprises a gap tooth positioned therein.

19. The angel wing seal of claim 14, further comprising a plurality of buckets and wherein the sinusoidally shaped outer edge flows continuously from a first bucket to a second bucket.

20. The angel wing seal of claim 14, further comprising a plurality of buckets and wherein the plurality of wing teeth flows continuously from a first bucket to a second bucket.

* * * * *